United States Patent
Dimitri et al.

[11] Patent Number: 5,970,030
[45] Date of Patent: Oct. 19, 1999

[54] AUTOMATED DATA STORAGE LIBRARY COMPONENT EXCHANGE USING MEDIA ACCESSOR

[75] Inventors: Kamal Emile Dimitri; Jerry Walter Hammar, both of Tucson, Ariz.

[73] Assignee: International Business Machines Corporation, Armonk, N.Y.

[21] Appl. No.: 08/984,039

[22] Filed: Dec. 2, 1997

[51] Int. Cl.$^6$ .................................................. G11B 17/22
[52] U.S. Cl. .................................................. 369/36
[58] Field of Search .................................. 369/34, 36, 39, 369/38, 33; 395/308, 500, 828; 364/200, 478.02, 478.06, 478.08, 478.16; 439/267, 843, 64; 711/114, 112, 111

[56] References Cited

U.S. PATENT DOCUMENTS

| | | | |
|---|---|---|---|
| 4,527,262 | 7/1985 | Manto | 369/33 |
| 4,540,228 | 9/1985 | Steele | 439/267 |
| 4,754,397 | 6/1988 | Varaiya et al. | 364/200 |
| 5,036,503 | 7/1991 | Tomita | 369/36 |
| 5,253,246 | 10/1993 | Leonhardt et al. | 369/291 |
| 5,289,589 | 2/1994 | Bingham et al. | 395/308 |
| 5,340,340 | 8/1994 | Hastings et al. | 439/64 |
| 5,388,946 | 2/1995 | Baur | 414/281 |
| 5,673,172 | 9/1997 | Hastings et al. | 361/685 |
| 5,752,257 | 5/1998 | Ripoll et al. | 711/114 |
| 5,768,141 | 6/1998 | Hanaoka et al. | 364/478.02 |
| 5,809,285 | 9/1998 | Hilland | 395/500 |

FOREIGN PATENT DOCUMENTS 5189861  7/1993  Japan .

OTHER PUBLICATIONS

Concurrent Maintenance Direct Access Storage Device for Computer Systems, IBM Technical Disclosure Bulletin, vol. 37, No. 04B, Apr. 1994, pp. 391–399.

*Primary Examiner*—David L. Ometz
*Assistant Examiner*—Angel Castro
*Attorney, Agent, or Firm*—John H. Holcombe; Robert M. Sullivan

[57] ABSTRACT

Disclosed is an automated data storage library in which a library accessor, arranged for accessing data recording media stored in storage bins, may also exchange electronic components of the library. The media are provided with access engagement surfaces for engagement by the library accessor(s). A plurality of removable mounts, having access engagement surfaces matching the data recording media access engagement surfaces, are provided for individually mounting electronic components, such as data storage drives and communication jumpers. Component slots are provided in the library for individually supporting the removable mounts, and mating low insertion force connectors are provided respectively on the removable mounts and ones of the component slots for removably connecting the electronic components to the library. Thus, a library accessor may engage selected removable mounts to change communication jumper locations and may change the data storage drives between library controllers, and replace a failed RAID data storage drive with a spare drive. Actuators may be operated by a library accessor to release and engage the low insertion force connectors to effectively provide zero insertion force connections.

40 Claims, 9 Drawing Sheets

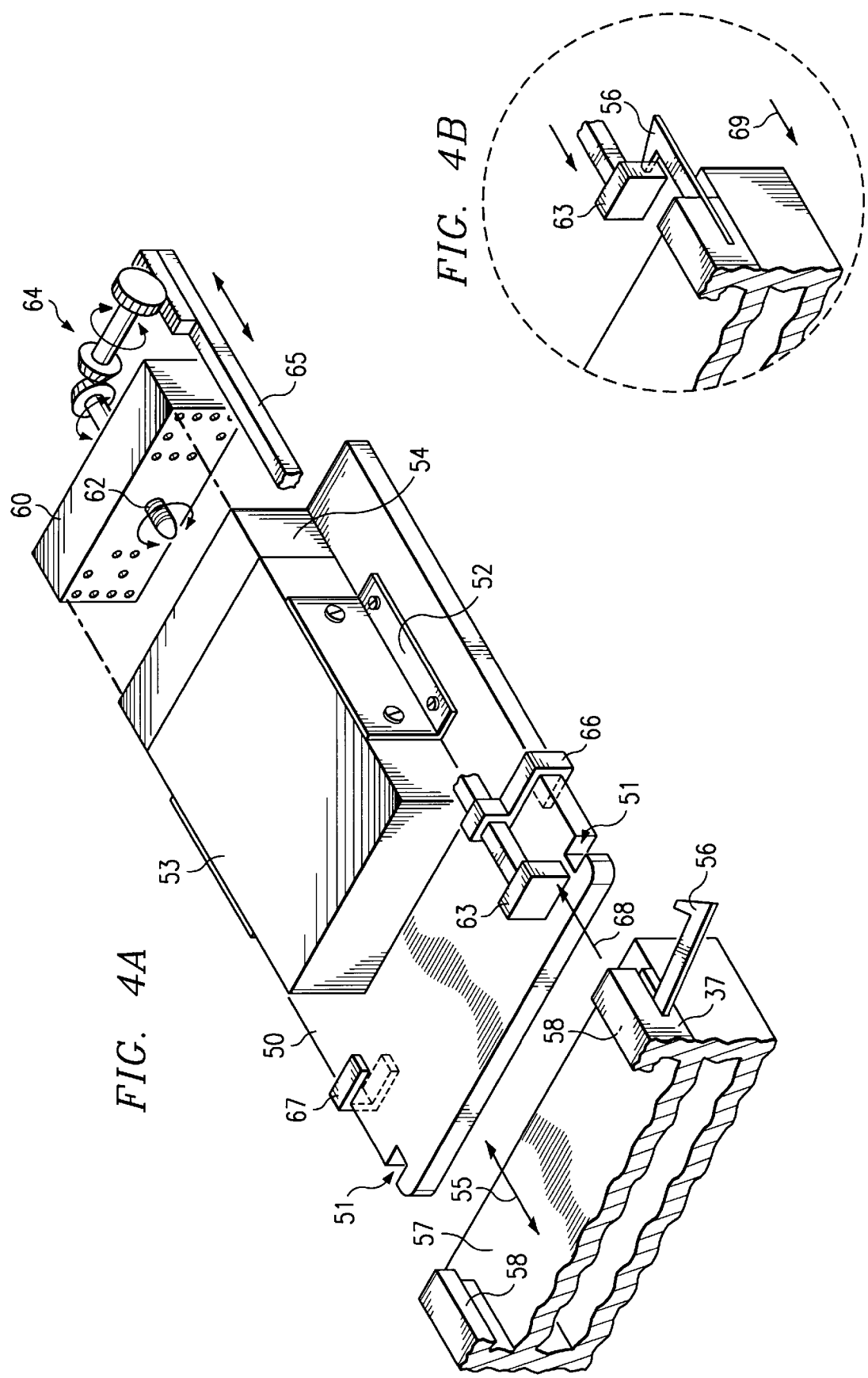

AUTOMATED DATA STORAGE LIBRARY COMPONENT EXCHANGE USING MEDIA ACCESSOR

TECHNICAL FIELD

This invention relates to automated data storage libraries having at least one media accessor which transports portable data recording media between storage bins and read/write recording devices, and, more particularly, to the exchange and replacement of electronic components of such automated data storage libraries.

BACKGROUND OF THE INVENTION

Automated data storage libraries are known for providing cost effective access to large quantities of stored data. Generally, automated data storage libraries include a large number of storage bins in each of which is stored a portable data recording medium. The typical portable data recording medium is a tape cartridge or an optical cartridge. An accessor or accessors typically accesses the data recording media from the storage bins and delivers the accessed media to a read/write recording device for reading and/or writing data on the accessed media. Suitable electronics, such as a library controller, both operates the accessors and transmits and/or receives data between an attached on-line host computer system and the read/write recording devices. A component of each library controller is often one or more data storage drives which contain the program for operating the library and tables for tracking the data stored in the portable data recording media and the bins in which the media are stored.

In a conventional automated data storage library, the storage bins are arranged in a planar orthogonal arrangement forming a "wall" of storage bins for holding data recording media. The plane may be a flat plane, or may be a cylindrical plane. To double the storage capacity, two "walls" of storage bins may be provided on either side of the accessors.

A number of different companies manufacture automated data storage libraries today, each model displaying various different features. Some of the automated data storage libraries have dual or multiple accessors to provide a level of redundancy, and some have dual library controllers to control the accessors, also providing a level of redundancy. One example is the dual accessor model IBM 3494 Data Storage Library. The redundancy may be for enhancing the access speeds, or to provide continuous operation in the event of a failure, or both. In some instances, complex electronic connections are made between the various accessors and various library controllers so that an electronic change can be made to alter the connections between the accessors and library controllers, for example, in the event an accessor fails or in the event a library controller fails.

As described above, automated data storage libraries provide a cost effective means of storing data. Such libraries typically come in a wide range of total cost, the higher cost systems typically providing the higher degree of redundancy. It would be advantageous in the lower cost environment to be able to provide a high degree of redundancy without the complex electronic connections.

Automated data storage library read/write recording devices may also fail and have to be replaced manually by service personnel and, if not replaced immediately, the library will run degraded until replaced.

Some automated data storage libraries have large cache memories for temporarily storing the data to be written or that has been read from the data recording media. One type of cache memory in use today is a plurality of data storage drives, such as magnetic disk drives, arranged in a RAID configuration. A RAID is a "redundant array of inexpensive disk drives" and stores data and parity amongst the disk drives in such a manner that, should one disk drive fail, the remainder may continue to operate without loss of any of the data. One example is the IBM 3494 model B16 Virtual Tape Server. The RAID configuration does operate at a significantly slower speed with one failed disk drive. Thus, it would be helpful to be able to replace the failed drive as soon as possible. The replacement of the failed drive is typically done manually, in that service personnel will bring a similar disk drive to the RAID array and manually disconnect the failed drive and insert the similar disk drive. A high cost replacement procedure is to provide a "hot spare" drive, which is without data and which has complex electronic connections that allow the hot spare drive to be switched electronically into the RAID so as to assume the responsibility of the failed drive and improve performance immediately.

SUMMARY OF THE INVENTION

An object of the present invention is to provide a low cost means for switching library controllers between accessors.

Another object of the present invention is to provide a low cost automation of the failed recording device or failed drive replacement processes.

Disclosed is an automated data storage library in which a library accessor, arranged for storing and accessing data recording media stored in storage bins, may also exchange electronic components of the library. The data recording media are provided with access engagement surfaces, and the library accessor(s) are arranged to engage the data recording media at the access engagement surfaces for transporting the data recording media. The library has at least one library controller for operating the accessor(s). The library also has various electronic components, such as data storage drives and communication jumpers. A plurality of removable mounts are provided for individually mounting ones of the electronic components, the removable mounts having access engagement surfaces matching the data recording media access engagement surfaces. A plurality of component slots are provided in the library for individually supporting ones of the removable mounts and the mounted electronic components. Mating low insertion force connectors are provided respectively on the removable mounts and at least ones of the component slots for removably connecting the electronic components to the library, so that a library accessor may engage selected ones of the plurality of removable mounts at the access engagement surfaces thereof to transport selected ones of the electronic components between selected ones of the plurality of component slots, and connect ones of the electronic components to the library with the mating low insertion force connectors.

Thus, a library accessor may change the jumper locations to change the library controller-library accessor connections, may change the data storage drives, and their associated tables, etc., between library controllers, may conduct the replacement of a failed RAID data storage drive with a spare drive, and may conduct the replacement of a spare read/write recording device with a spare device.

The automated data storage library may additionally comprise actuators for releasing and engaging the low insertion force connectors, so that the library accessor may operate the actuator upon engaging and connecting the removable mounts and the component slots to provide zero insertion force connection therebetween.

For a fuller understanding of the present invention, reference should be made to the following detailed description taken in conjunction with the accompanying drawings.

BRIEF DESCRIPTION OF THE DRAWINGS

FIGS. 4A and 4B are perspective illustrations of a removable mount and mounted data storage drive with accessor gripper and library mounted actuator, and the accessor gripper operating the actuator, in accordance with the present invention;

DETAILED DESCRIPTION OF THE INVENTION

Figure 1:
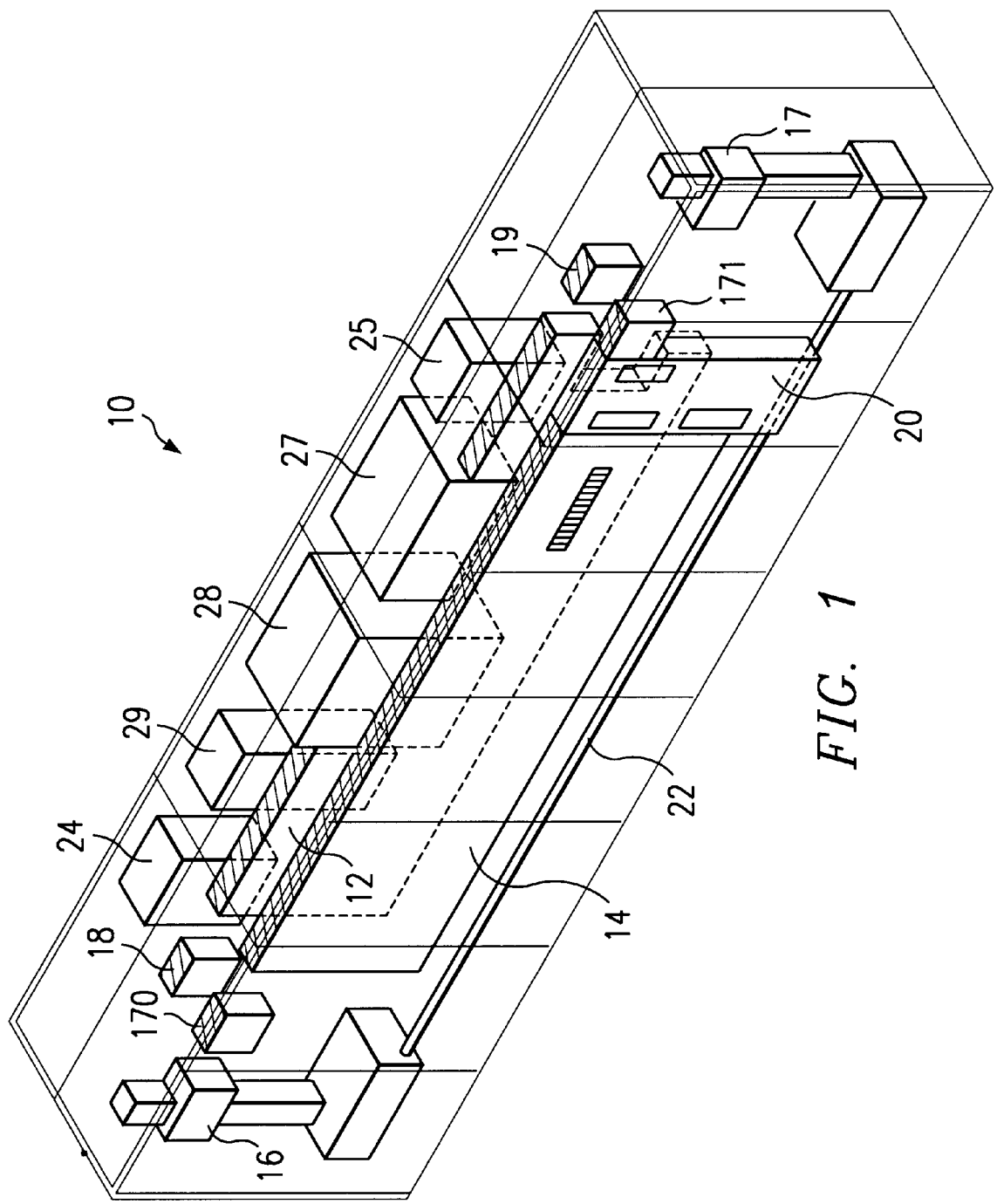
FIG. 1 is a diagrammatic representation of an automated data storage library in accordance with the present invention.

Referring to FIG. 1, an automated data storage library 10 is illustrated having an inner "wall" of storage bins 12 and an outer wall of storage bins 14, which store data recording media. Typically, the data recording media are self-contained within a portable container, or cartridge. Examples of such data recording media include magnetic tape cartridges or cassettes, optical disk cartridges of various types, including ROM, WORM and rewritable, and in various formats. For universal reference to any of these types of media, the terms "data recording media" or "media" are used herein.

The embodiment of the library of the present invention illustrated in FIG. 1 has at least one library accessor, and two accessors 16 and 17 are illustrated. An accessor is a robotic device which accesses the data recording media from the storage bins 12 and 14 and delivers the accessed media to read/write recording devices 18 and 19 for reading and/or writing data on the accessed media and returns the media to storage bins 12 and 14. A media import/export port 20 is provided for insertion or retrieval of data recording media into or out of the library. In the illustrated embodiment, the accessors 16 and 17 run on a rail 22 in an aisle between the inner wall of storage bins 12 and the outer wall of storage bins 14.

In the illustrated embodiment, multiple library controllers 24 and 25 are provided to manage the positioning and access of the accessors 16 and 17 to transport data recording media between storage bins 12 and 14, import/export port 20 and read/write recording devices 18 and 19. One example of a dual accessor and dual library controller library is the dual accessor model IBM 3494 Data Storage Library, for storing magnetic tape cartridges. The redundancy may be for enhancing the access speeds, or to provide continuous operation in the event of a failure, or both.

Typically, the library controller 24 or 25 comprises a computer processor and suitable data memory and data storage capability to control the operation of the library 10. Specifically, the library controller 24 or 25 controls the actions of the robot accessors 16 and 17. The conventional library controller 24 or 25 is interconnected through a provided interface to a host processor (not shown), which provides commands requesting access to particular data recording media or to media in particular storage bins. Each of the library controllers 24 or 25 is typically provided with a database, which includes tables and programs, which, in the illustrated embodiment, are stored on data storage drives, such as magnetic disk drives. In the embodiment of the present invention, the data storage drives and a number of communication jumpers are provided in a set of slots 27. The multiple accessors and the multiple library controllers provide a level of redundancy. In the embodiment of the present invention, the set of data storage drive and communication jumper slots 27 are in the same plane as the planar array of data recording media storage slots 12.

Also in the illustrated embodiment, a RAID configuration 28 of data storage drives are provided as a large cache memory for temporarily storing the data to be written or that has been read from the data recording media. Commands for access to data or to locations on the data recording media and information to be recorded on, or to be read from, selected data recording media are typically transmitted directly to the cache memory between the read/write recording devices 18–19 and the host. As described above, RAID is a "redundant array of inexpensive disk drives" and stores data and parity amongst the data storage drives in such a manner that, should one data storage drive fail, the remainder may continue to operate without loss of any of the data. One example is the IBM 3494 model B16 Virtual Tape Server. In the embodiment of the present invention, the data storage drives of the RAID configuration 28 are arranged in slots which are in the same plane as the planar array of data recording media storage bins 12.

An operator input station 29 may be provided for allowing an operator to communicate with the automated data storage library.

Figure 2:
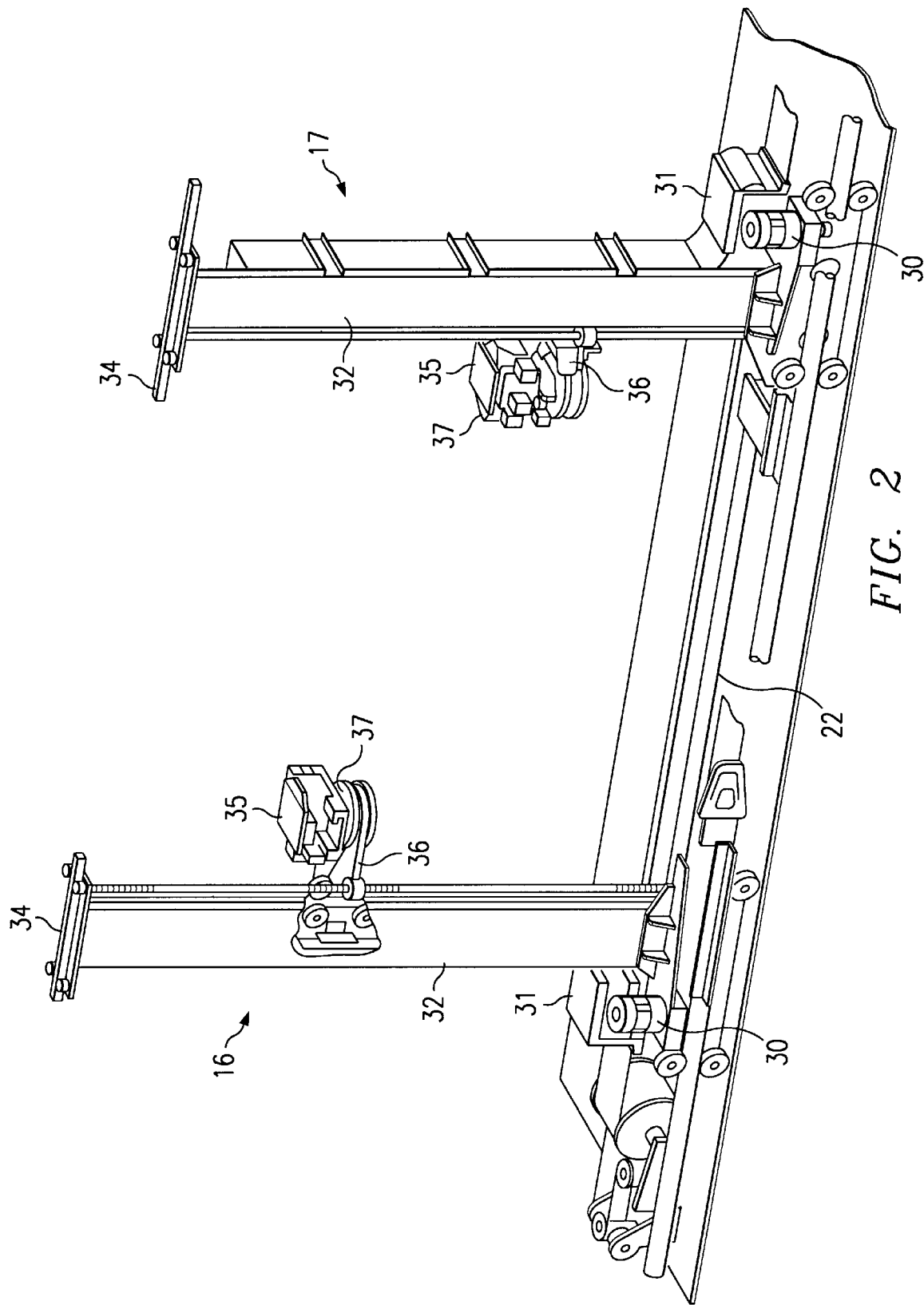
FIG. 2 is a perspective view illustration of the accessors of the automated data storage library of FIG. 1.

The accessors 16 and 17 are illustrated in greater detail in FIG. 2. The accessors run on the rails 22 along the library aisle by motors 30 in running servo sections 31. A pillar 32 is vertically attached to each of the running sections 31 of the accessors and rides in top rail 34 to provide vertical stability. Robotic pickers 35 are mounted on lifting servo sections 36 which can move vertically along the pillars 32.

In the embodiment illustrated in FIG. 2, each of the robotic pickers 35 includes at least one gripper 37. As additionally illustrated in FIG. 1, each gripper 37 can be rotated to provide access to either inner storage bins 12 or outer storage bins 14. Also, one gripper can grip a data storage medium at an outside storage bin 14 of FIG. 1 and be rotated to deliver the data storage medium to a read/write recording device 18 or 19 at the inside of the library.

Figure 3A:
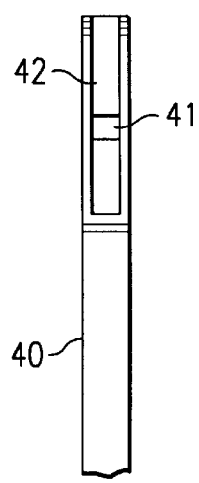
FIGS. 3A and 3B are partially cutaway side and plan views, respectively, of a data recording media cartridge.
Figure 3B:
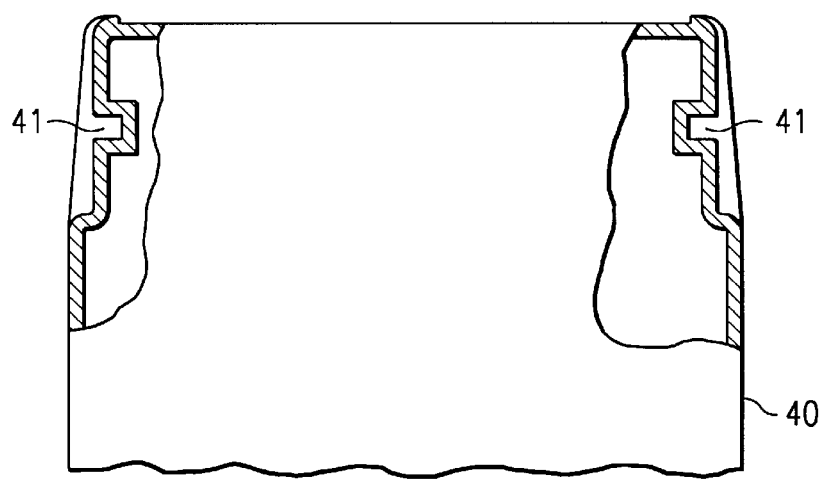

FIGS. 3A and 3B illustrate an embodiment of a data recording media cartridge 40. Apertures 41 are located on either side of the cartridge 40 in cavities 42 for engagement by gripper 37. The cartridge 40 may contain an optical disk, or may contain a reel of magnetic tape for the storage of data.

FIGS. 4A and 4B illustrate an embodiment of a removable mount 50 having apertures 51 which comprises access engagement surfaces matching the access engagement surfaces 41 of the data recording media 40. Brackets 52 mount an electronic component 53, such as a data storage drive. The data storage drive 53 may comprise, for example, a conventional "DASD" magnetic disk drive of suitable form factor, such as a 3.5 inch form factor. The data storage drive is electrically connected to a connector 54 which has a set of electrical pins for a low insertion force connection, as will be described.

A gripper 37 of one of the robotic pickers of one of the accessors moves in the direction of arrow 55, and fingers 56 engage the removable mounting 50 at access engagement surfaces 51 to unload the removable mounting 50 from its slot. The removable mounting is moved onto surface 57 to support the removable mounting so that the associated accessor may transport the removable mounting. The gripper 37 is open at the top 58 to accommodate the height of the data storage drive as it is unloaded.

Referring additionally to FIG. 4A, the removable mounting 50 with a data storage drive 53 is placed in one of the set of data storage drive slots 27 or the data storage drive slots of the RAID configuration 28. Ones of the slots include a low insertion force connector module 60 which mates with the pins of connector 54 of the removable mounting 50. A library mounted actuator allows the accessor to connect or disconnect connector module 60 and connector 54. As an example, the library mounted actuator employs a 180 degree quick turn disconnect jack 62 which is operated to mate the slot low insertion force connector module 60 with the removable mounting connector 54. An actuator probe 63 is connected to the jack 62 by a gear train 64 and actuator bar 65 supported in guide 66. The guide 66 may also support the removable mount 50 together with guide 67. Thus, gripper 58 may push the probe 63, as shown in FIG. 4A by arrow 68, and gripper finger 56 may pull the probe 63, as shown in FIG. 4B by arrow 69, to twist the jack clockwise or counterclockwise to connect or disconnect connector module 60 and connector 54.

The operation of the library mounted actuator by the accessor gripper allows the low insertion force connections to be connected as a zero insertion force connection.

Figure 5A:
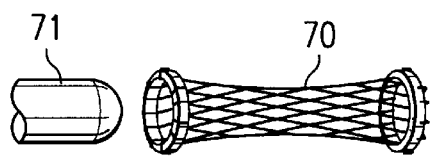
FIGS. 5A, 5B and 5C are a sequence of perspective views of a low insertion force connector and probe.
Figure 5B:
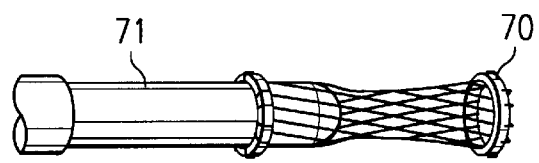
Figure 5C:
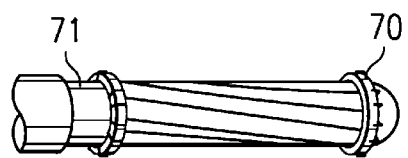

FIGS. 5A, 5B and 5C illustrate an exemplary low insertion force connector comprising a hyperboloid sleeve. One example of a hyperboloid sleeve is the Hypertac interconnect by Hypertronics Corporation. FIG. 5A shows a wire sleeve 70 before insertion of pin 71; FIG. 5B shows the wire sleeve 70 with the pin 71 partially inserted; and FIG. 5C shows the pin 71 completely inserted into the sleeve 70.

Figure 6:
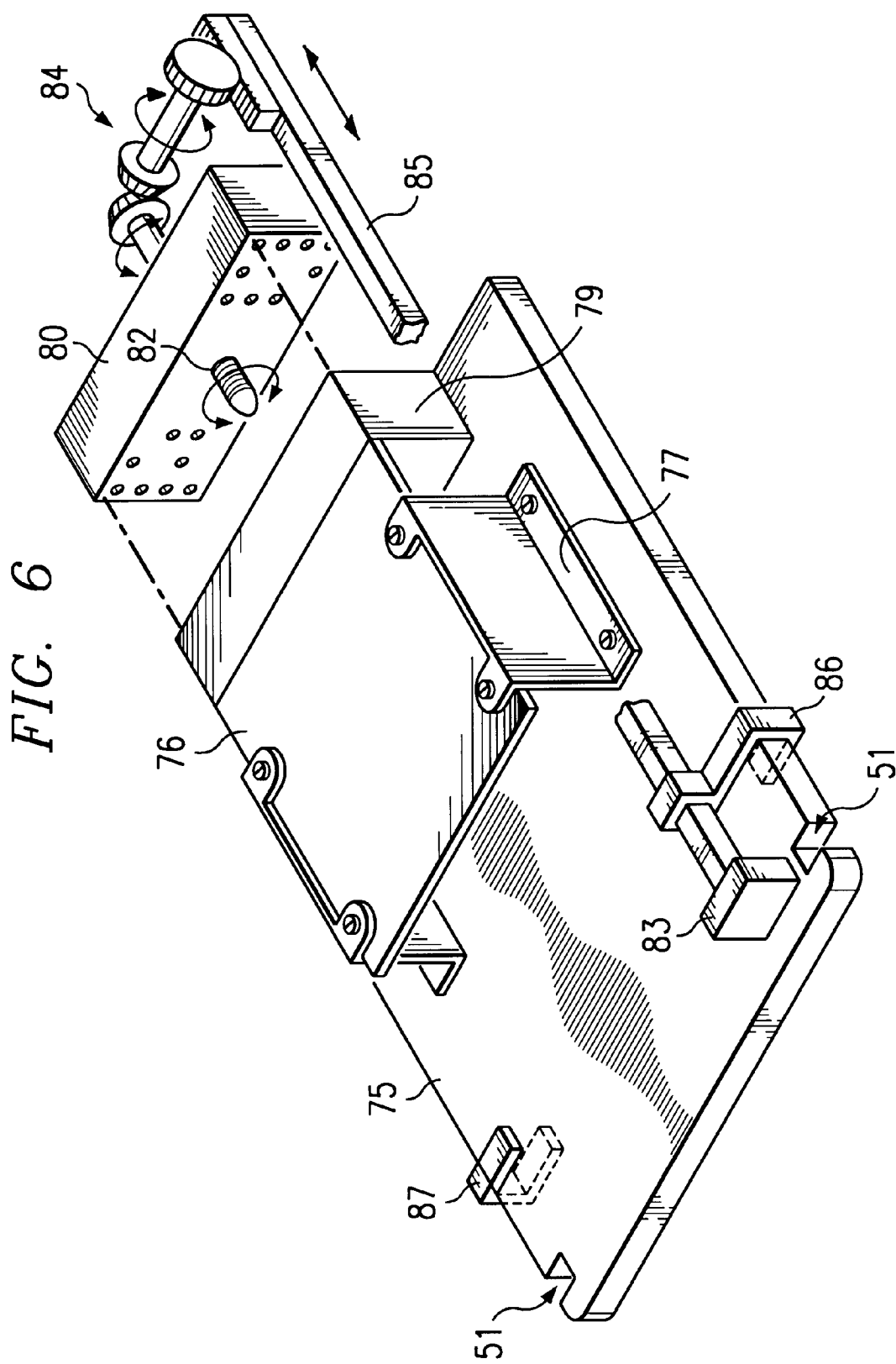
FIG. 6 is a perspective illustration of a removable mount and mounted communication jumper and library mounted actuator, in accordance with the present invention.

FIGS. 6 illustrates an embodiment of a removable mount 75 for mounting an electronic component 76, such as a communication jumper electronics card. The communication jumper 76 is mounted on the removable mount by means of brackets 77. The removable mount 75 also includes apertures 51 which comprise access engagement surfaces matching the access engagement surfaces 41 of the data recording media 40. The electronic component is electrically connected to a connector 79 which has a set of electrical pins for a low insertion force connection, as described above.

As with respect to the drive slots, above, the communication jumper slots 27 include a low insertion force connector module 80 which mates with the connector 79 of the removable mounting 75. A similar library mounted actuator allows the accessor to connect or disconnect connector module 60 and connector 54. Again, as an example, the library mounted actuator employs a 180 degree quick turn disconnect jack 82 which is operated to mate the slot low insertion force connector module 80 with the removable mounting connector 75. An actuator probe 83 is connected to the jack 82 by a gear train 84 and actuator bar 85 supported in guide 86. The guide 86 may also support the removable mount 75 together with guide 87. Thus, a gripper may push the probe 83 and a gripper finger may pull the probe 83 to twist the jack clockwise or counterclockwise to connect or disconnect connector module 80 and connector 75.

Figure 7:
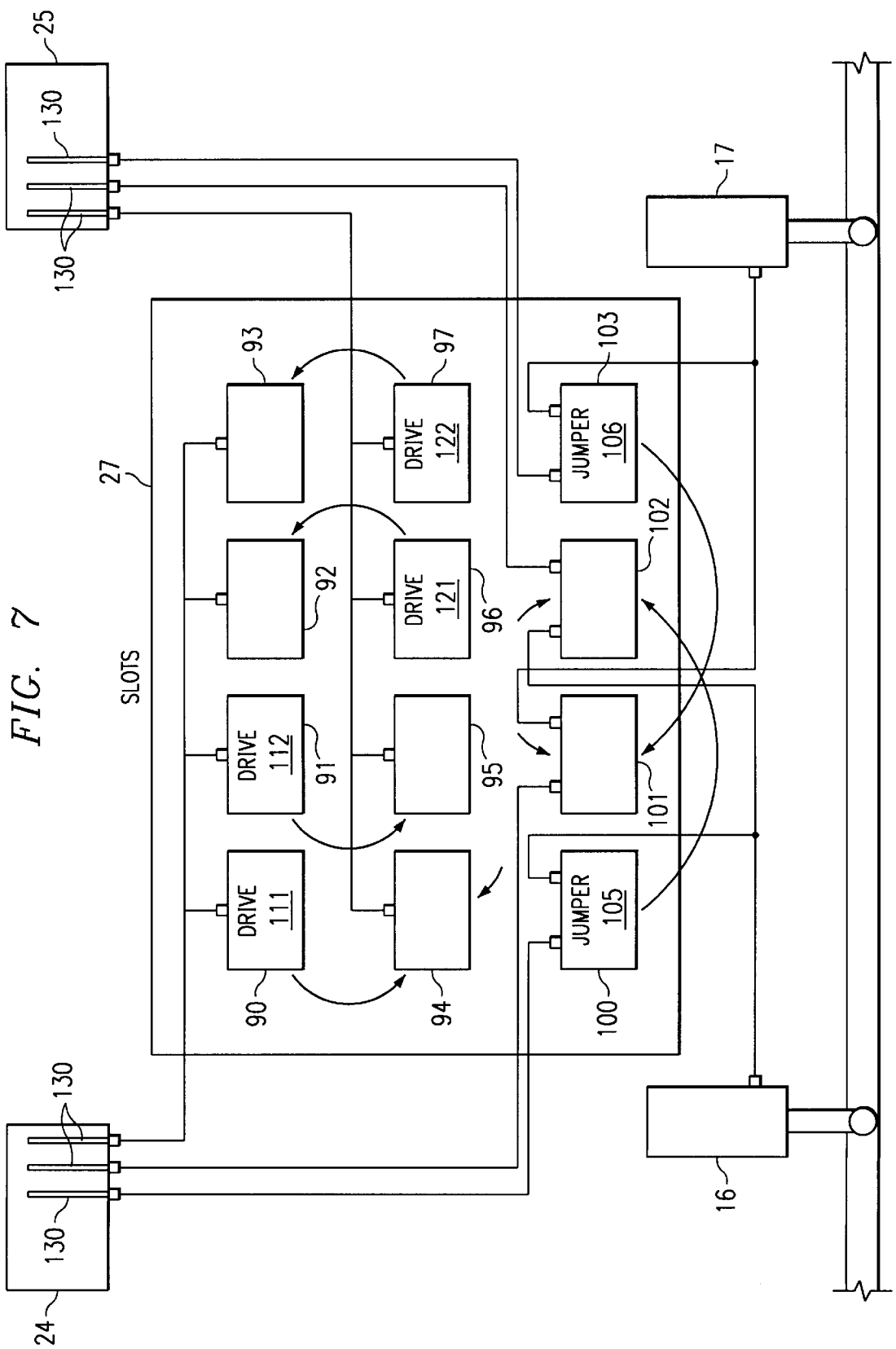
FIG. 7 is a diagrammatic illustration of disk drives and communication jumpers with library controllers and library accessors in accordance with the invention.

The set of slots 27, in the embodiment of the present invention, for the data storage drives and a number of communication jumpers are illustrated in FIG. 7. Each of the library controllers 24 or 25 is typically provided with a database, which includes tables and programs, which, in the illustrated embodiment, are stored on data storage drives. Drive slots 90–93 are provided for the data storage drives, or "DASD", for library controller 24, and drive slots 94–97 are provided for the data storage drives for library controller 25. In accordance with the present invention, each of the drive slots has a connector for connecting a data storage drive mounted on a removable mount.

Jumper slots 100–103 are provided for holding communication jumpers 105 and 106 which selectively interconnect the library controllers 24 and 25 with library accessors 16 and 17, as will be explained.

In FIG. 7, each library controller has adapter cards 130 which provide connections to the slots 27. Specifically, library controller 24 is connected to two data storage drives 111 and 112, which are mirrored (contain duplicate copies) to each other, and library controller 25 is connected to two data storage drive 121 and 122, which are also mirrored. The mirrored data storage drives each store the tables and programs for the respective library controller which are used by the library controller to control the operation of the associated library accessor. When communication jumper 105 is in jumper slot 100, the communication jumper 105 connects library controller 24 to library accessor 16, and, when communication jumper 106 is in jumper slot 103, the communication jumper 106 connects library controller 25 to library accessor 17.

Both library controllers may therefore independently operate the respective library accessors to access ones of said data recording media and transport the media between the storage bins and the read/write recording devices.

Should one of the library controllers fail, for example library controller 24, then, in accordance with the present invention, library controller 25 may command library accessor 17 to unload the removable mounts for data storage drive 111 and data storage drive 112 from drive slots 90 and 91 and reload them into drive slots 94 and 95, and unload the removable mount for communication jumper 105 from jumper slot 100 and reload it into jumper slot 102. As the result, data storage drive 111 and data storage drive 112 in drive slots 94 and 95 are connected to library controller 25 to provide the tables and programs (that had been used by library controller 24) for the operation of library accessor 16 which are now used by the library controller 25 to control the operation of the library accessor 16, and, at the same time, library controller 25 operates the library accessor 17 using the tables and programs of data storage drives 121 and 122.

Figure 8:
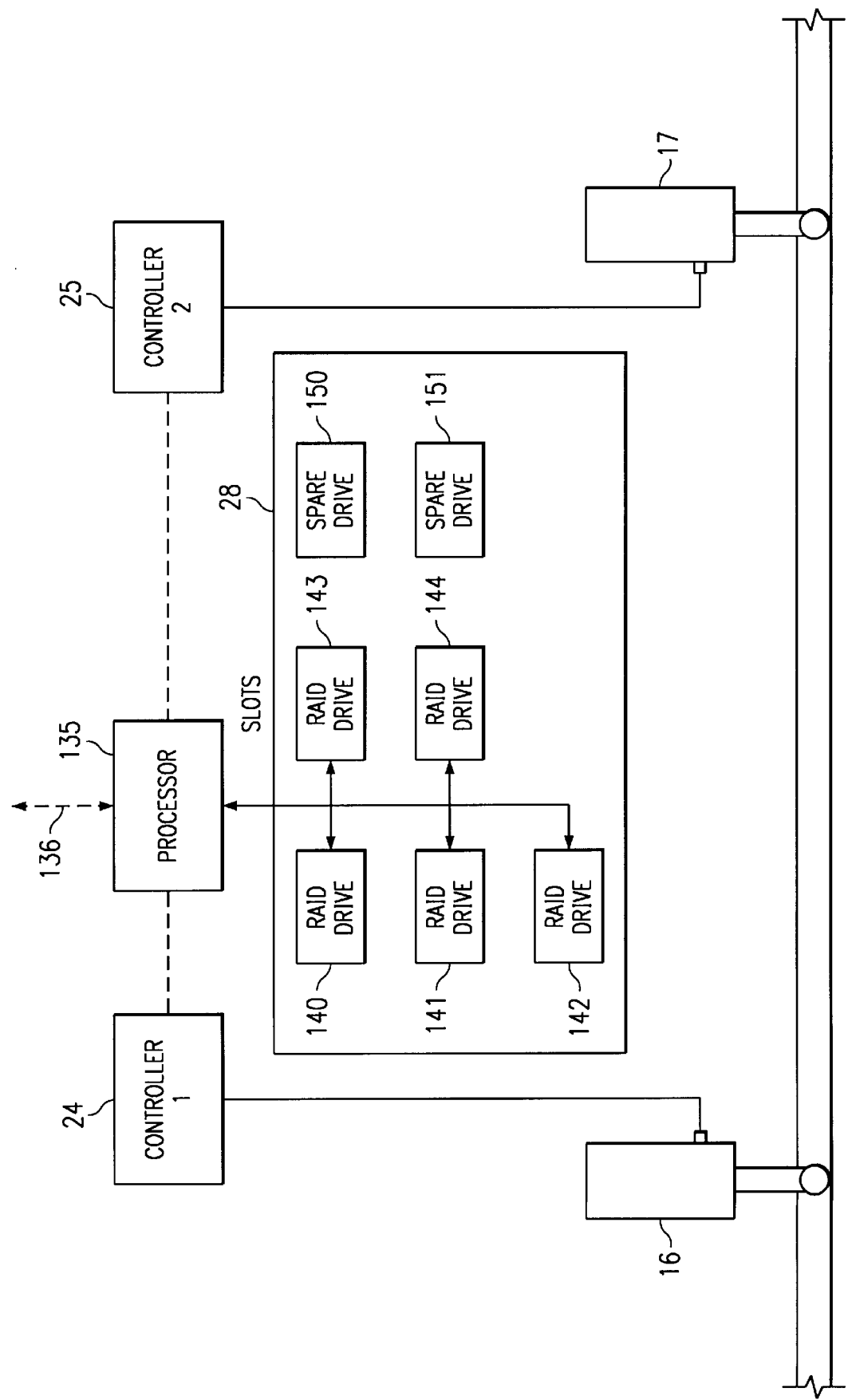
FIG. 8 is a diagrammatic illustration of disk drives and a RAID configuration with library controllers and library accessors in accordance with the invention.

The set of slots 28, in the embodiment of the present invention, for the data storage drives of the RAID configuration are illustrated in FIG. 8. A RAID processor 135 may operate the RAID configuration as a data cache to store data received from an input 136. In accordance with the present invention, each of the RAID drive slots 140–144 has a connector for connecting a data storage drive mounted on a removable mount. Drive slots 150 and 151 do not have such connectors, and hold drives that are spares only. The spare drives are idle and thereby do not experience the wear of a "hot" spare drive. In the RAID configuration, drive slots 140–144 are connected to the processor 135 and the mounted RAID data storage drives, or "DASD", provide the storage of data and a level of redundancy, such as parity, in accordance with one of the several RAID configurations so that, should one of the RAID data storage drives fail, the remaining RAID data storage drives still have enough information to provide all of the stored data and continue to operate. However, with one drive failed, the RAID configuration may now lack redundancy and may operate slowly while the parity information is decoded.

Therefore, in accordance with the present invention, one of the library controllers 24 or 25 operates one of the library accessors 16 or 17 to unload the removable mount with the failed RAID data storage drive from its RAID drive slot, and the same library accessor (if it has two grippers), or the other library controller operates the other library accessor to unload a spare drive from a spare drive slot 150 or 151 and load the spare drive in the vacated RAID drive slot.

The RAID processor may then begin to rebuild the parity and data for the previously spare drive from the data and parity of the remaining RAID drives, in accordance with conventional RAID procedures.

Figure 9:
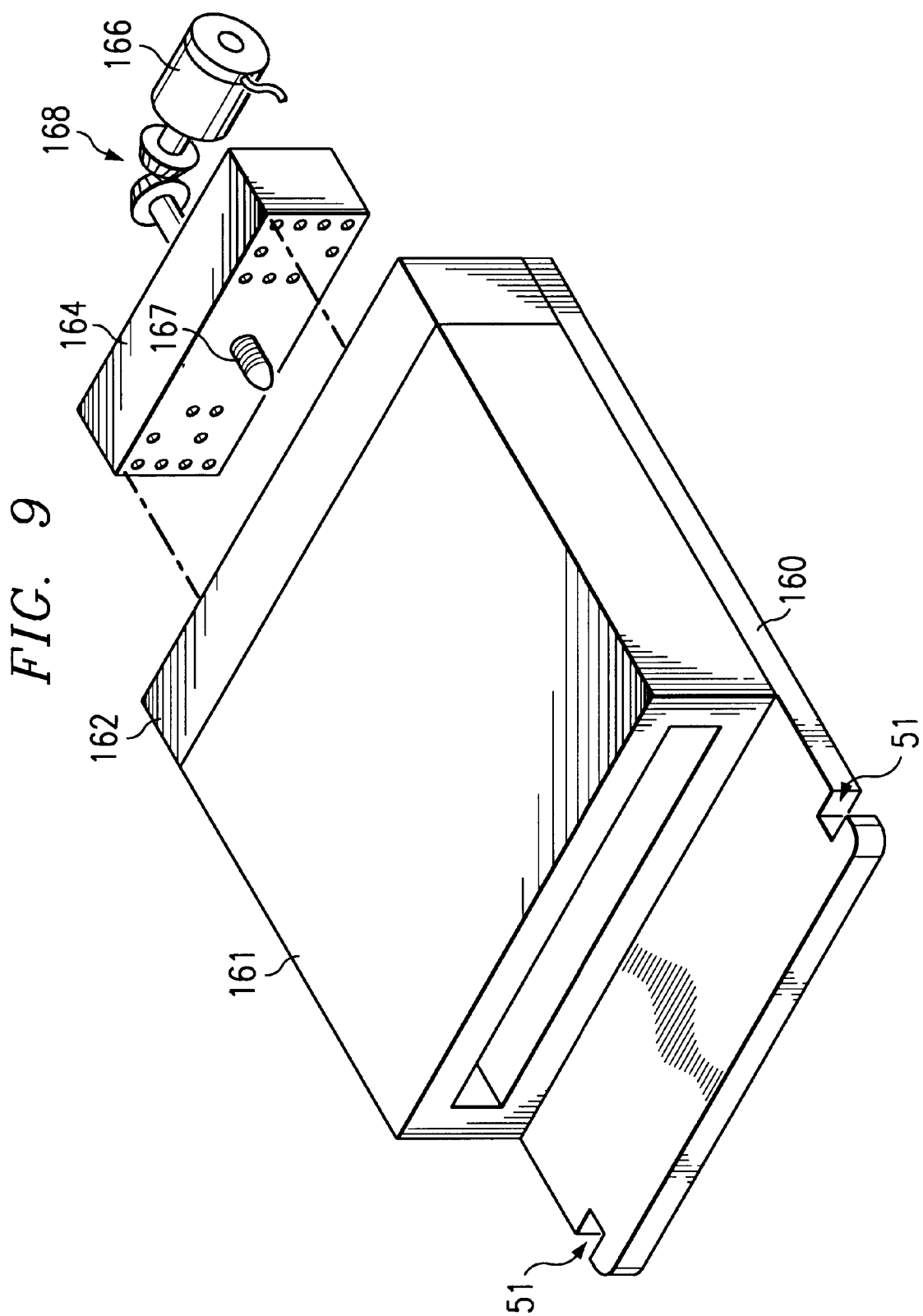
FIG. 9 is a diagrammatic illustration of a read/write recording device mounted on a removable mount, and a motorized actuator, in accordance with the present invention.

Referring to FIG. 9, in accordance with the present invention, an embodiment of a removable mount 160 is illustrated for mounting a read/write recording device 161. The removable mount 160 also includes apertures 51 which comprises access engagement surfaces matching the access engagement surfaces 41 of the data recording media 40. The read/write recording device is electrically connected to a connector 162 which has a set of electrical connectors for a low insertion force connection, as described above.

Referring to FIGS. 1 and 2, component slots, similar to drive and component slots, above, are located in read/write recording device areas 18 or 19, which include a low insertion force connector module 164 which mates with the connector 162 of the removable mounting 160. A library mounted actuator is driven by motor 166 to connect or disconnect connector module 164 and connector 162. Again, the library mounted actuator employs a 180 degree quick turn disconnect jack 167 which is operated by motor 166 by means of a gear train 168 to mate the slot low insertion force connector module 164 with the removable mounting connector 162.

The motorized actuator may be employed with any of the electronic component modules, avoiding the need for the library accessor to push and pull the actuator probe. The motorized actuator is primarily needed where, as with respect to the read/write recording device, the mounted electronic component is sufficiently wide that the probe does not fit alongside.

Component slots 170 and 171 do not have such connectors, and hold one or more read/write recording devices that are spares only.

Therefore, in accordance with the present invention, in the event one of the read/write recording devices 161 in device areas 18 or 19 fails, one of the library controllers 24 or 25 operates one of the library accessors 16 or 17 to unload the removable mount with the failed read/write recording device from its slot in device area 18 or 19. The same library accessor (if it has two grippers) is operated (or the other library controller operates the other library accessor) to unload a spare read/write recording device from a component slot 170 or 171 and load the spare drive in the vacated slot in device area 18 or 19.

The operation of the library accessor by the one of the library controllers must, however, take into account the fact that the read/write recording device in the slot in device area 18 or 19 also serves as the location address for the library accessor to provide data recording media to the read/write recording device.

Therefore, the slots in device area 18 or 19 having the mating low insertion force connectors for removably connecting the read/write recording devices are provided with location addresses identifying the devices. These addresses are different from the addresses for the devices for receiving the data recording media, so that the library controller may exchange the read/write recording devices.

Figure 10:
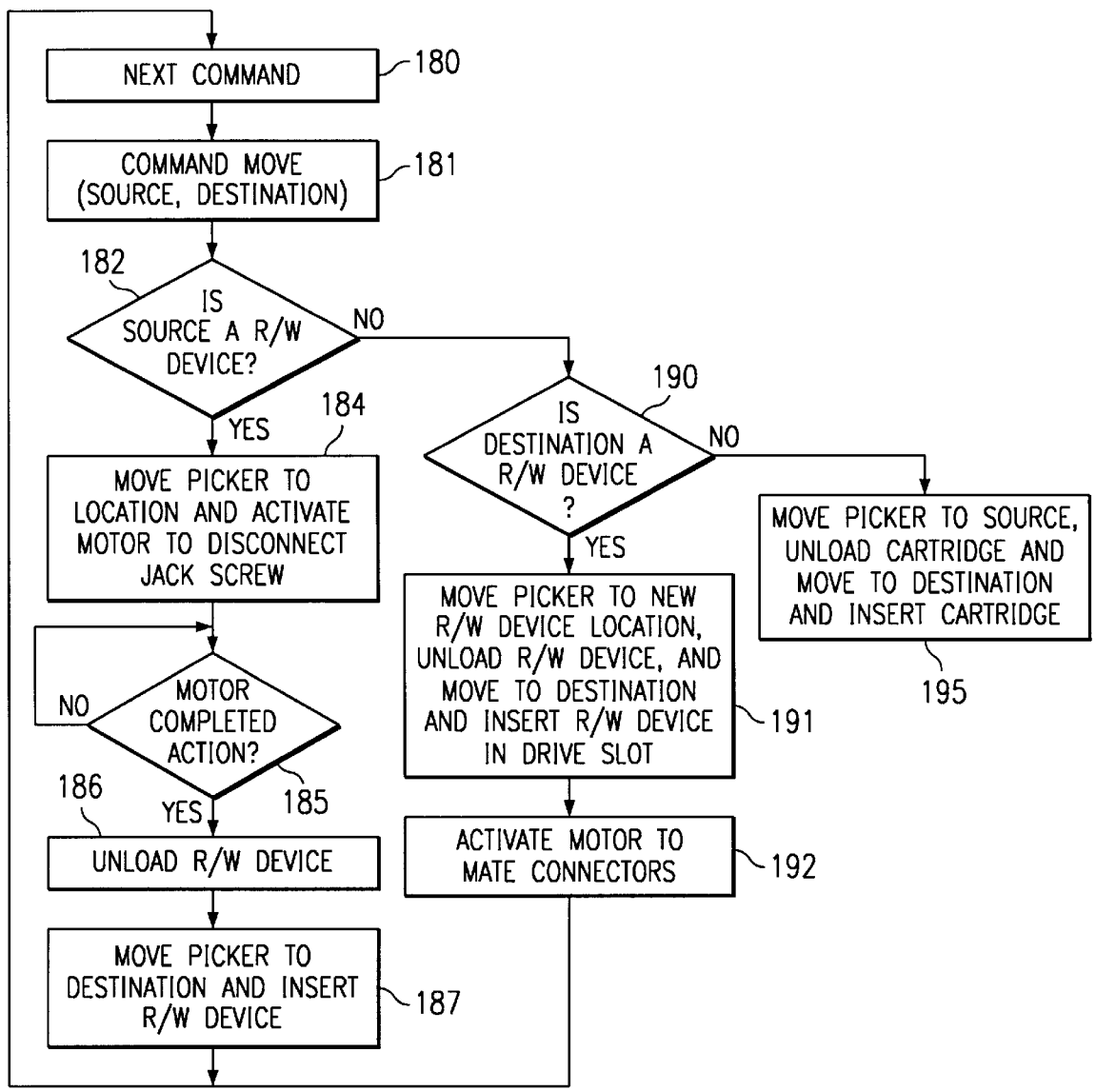
FIG. 10 is a flow diagram illustrating the operation of a library controller in accordance with the present invention.

FIG. 10 is a flow diagram illustrating the operation of the library controller. The process is entered at step 180, and a move command is received in step 181. The move command identifies the source and destination addresses for the accessor move operation to be controlled by the library controller. Step 182 detects whether the address is that of a read/write recording device in the slot in device area 18 or 19. If "Yes", in step 184, the library controller 24 or 25 operates one of the library accessors 16 or 17 with its picker to move to the slot location. The library controller also activates the motor 166 to rotate the jack screw 167 to disconnect the slot low insertion force connector module 164 from the removable mounting connector 162. Step 185 detects when the motor operation is completed, and, in step 186, the library controller 24 or 25 operates the library accessor picker to unload the removable mount 160. In step 187, the library controller moves the library accessor to transport the read/write recording device to the destination address and insert the device in the destination slot, which may be a spare slot 170 or 171.

If step 182 indicated the source address was not a slot in device area 18 or 19, step 190 determines whether the destination address is a slot in device area 18 or 19. If "Yes", the library accessor is to unload and transport a removable mount 160 mounting a read/write recording device 161 from a spare slot 170 or 171 to device area 18 or 19. In step 191, the library controller 24 or 25 operates one of the library accessors 16 or 17 and its picker to unload the device, and operates the library accessor to move to the destination location slot in device area 18 or 19, and insert the device in the slot. At step 192, the library controller activates the motor 166 to rotate the jack screw 167 to connect the slot low insertion force connector module 164 to the removable mounting connector 162.

If neither the source or destination address location is a read/write recording device slot in area 18 or 19, a cartridge move is instead intended and is accomplished in step 195.

It may be possible to envision other electronic components of the automated data storage library that may be mounted on removable mounts for exchange or change of configuration, or for spares.

While the preferred embodiments of the present invention have been illustrated in detail, it should be apparent that modifications and adaptations to those embodiments may occur to one skilled in the art without departing from the scope of the present invention as set forth in the following claims.

We claim:

1. An automated data storage library for storing and accessing a plurality of data recording media stored in a plurality of storage bins, said data recording media having access engagement surfaces, comprising:

at least one read/write recording device for receiving said data recording media and reading and/or writing data thereon;

a plurality of data storage drives;

a plurality of removable mounts for individually mounting ones of said data storage drives, said removable mounts having access engagement surfaces matching said data recording media access engagement surfaces;

a plurality of drive slots in said library for individually supporting ones of said removable mounts and said mounted data storage drives;

at least one library accessor for accessing said data recording media and said removable mounts, engaging said data recording media and said removable mounts at said access engagement surfaces thereof, and transporting said data recording media and said removable mounts; and at least one library controller for operating said at least one library accessor to access and transport said data recording media between said storage bins and said at least one read/write recording device, and operating said at least one library accessor to engage selected ones of said plurality of data storage drive removable mounts at said access engagement surfaces thereof to transport selected ones of said data storage drives between selected ones of said plurality of drive slots.

2. The automated data storage library of claim 1, wherein said storage bins are arranged in a planar array, and wherein said plurality of drive slots are arranged in the plane of said planar array for access thereto by said at least one accessor.

3. The automated data storage library of claim 1, wherein said removable mount access engagement surfaces comprise engagement apertures for engagement by said at least one accessor.

4. The automated data storage library of claim 1, wherein said data storage drive removable mounts and at least ones of said drive slots additionally comprise mating low insertion force connectors for removably connecting said data storage drives to said library.

5. The automated data storage library of claim 4, additionally comprising actuators for releasing and engaging said low insertion force connectors, thereby providing zero insertion force connection.

6. The automated data storage library of claim 5, wherein said low insertion force actuators are mounted on said library at ones of said drive slots.

7. The automated data storage library of claim 4, wherein at least one of said data storage drives is a spare, so that said at least one library controller may operate said at least one library accessor to exchange said spare data storage drive with another data storage drive.

8. The automated data storage library of claim 7, wherein ones of said data storage drives are in a RAID configuration, and wherein said at least one library controller may operate said at least one library accessor to substitute said spare data storage drive with a data storage drive of said RAID configuration.

9. The automated data storage library of claim 1, wherein ones of said data storage drives store data related to ones of said library accessors and ones of said plurality of drive slots are associated with ones of said library controllers, so that said mounted data storage drives may be exchanged between said library controllers, and wherein said library additionally comprises:

removable mounts supporting communication jumpers, said removable mounts having access engagement surfaces matching said data recording media access engagement surfaces; and a plurality of jumper slots in said library for individually supporting ones of said removable mounts and said mounted communication jumpers, so that said at least one library controller may operate said at least one library accessor to engage selected ones of said plurality of communication jumper removable mounts at said access engagement surfaces thereof to transport selected ones of said communication jumpers between selected ones of said plurality of jumper slots.

10. The automated data storage library of claim 9, wherein said data storage drive removable mounts and at least ones of said drive slots, and said communication jumper removable mounts and said jumper slots, additionally comprise mating low insertion force connectors for removably connecting said data storage drives to said library.

11. The automated data storage library of claim 10, additionally comprising actuators for releasing and engaging said low insertion force connectors, thereby providing zero insertion force connection.

12. The automated data storage library of claim 11, wherein said low insertion force actuators are mounted on said library at ones of said drive slots and at said jumper slots and are operated by said actuator.

13. The automated data storage library of claim 11, wherein at least one of said low insertion force actuators comprises a motor for operating said actuator, and said motor is operated by said at least one library controller.

14. An automated data storage library for storing and accessing a plurality of data recording media stored in a plurality of storage bins, said data recording media having access engagement surfaces, comprising:

at least one read/write recording device for receiving said data recording media and reading and/or writing data thereon;

a plurality of removable mounts for individually mounting electronic components, said removable mounts having access engagement surfaces matching said data recording media access engagement surfaces;

a plurality of component slots in said library for individually supporting ones of said removable mounts and said mounted electronic components;

mating low insertion force connectors respectively on said removable mounts and at least ones of said component slots for removably connecting said electronic components to said library;

at least one library accessor for accessing said data recording media and said removable mounts, engaging said data recording media and said removable mounts at said access engagement surfaces thereof, and transporting said data recording media and said removable mounts; and at least one library controller for operating said at least one library accessor to access and transport said data recording media between said storage bins and said at least one read/write recording device, and operating at least one library accessor to engage selected ones of said plurality of removable mounts at said access engagement surfaces thereof to transport selected ones of said electronic components between selected ones of said plurality of component slots, and connect ones of said electronic components to said library with said mating low insertion force connectors.

15. The automated data storage library of claim 14, additionally comprising actuators for releasing and engaging said low insertion force connectors, thereby providing zero insertion force connection.

16. The automated data storage library of claim 15, wherein said low insertion force actuators are mounted on said library at said ones of said component slots having said low insertion force connectors.

17. The automated data storage library of claim 14, wherein said electronic components comprise said read/write recording devices.

18. The automated data storage library of claim 17, wherein said at least ones of said component slots having said mating low insertion force connectors for removably connecting said read/write recording devices are provided with location addresses identifying said devices which are different from location addresses for said devices for receiving said data recording media, whereby said at least one library controller may exchange ones of said read/write recording devices wherein at least one of said read/write recording devices is located at one of said component slots having said mating low insertion force connectors.

19. The automated data storage library of claim 18, additionally comprising at least one actuator for releasing and engaging said low insertion force connectors, thereby providing zero insertion force connection.

20. The automated data storage library of claim 19, wherein said at least one low insertion force actuator is mounted on said library at one of said component slots having said mating low insertion force connectors.

21. The automated data storage library of claim 20, wherein said at least one low insertion force actuator comprises a motor for operating said actuator, and said motor is operated by said at least one library controller.

22. An automated data storage library for storing and accessing a plurality of data recording media stored in a plurality of storage bins, said data recording media having access engagement surfaces, comprising:

at least one read/write recording device for receiving said data recording media and reading and/or writing data thereon;

a RAID configuration for interconnecting a plurality of data storage drives;

a plurality of removable mounts for individually mounting, and providing data connections for, ones of data storage drives, said removable mounts having access engagement surfaces matching said data recording media access engagement surfaces;

a plurality of drive slots in said library for individually supporting ones of said removable mounts and said mounted data storage drives, ones of said drive slots having mating data connections for said data storage drive data connections connected to said RAID configuration, and at least one of said mounted data storage drives is a spare;

at least one library accessor for accessing said data recording media and said removable mounts, engaging said data recording media and said removable mounts at said access engagement surfaces thereof, and transporting said data recording media and said removable mounts; and at least one library controller for operating said at least one library accessor to access and transport said data recording media between said storage bins and said at least one read/write recording device, and operating said at least one library accessor to engage said mounted spare data storage drive removable mounts at said access engagement surfaces thereof to transport and connect said mounted spare data storage drive to one of said RAID configuration drive slots to substitute said spare data storage drive for a data storage drive of said RAID configuration.

23. The automated data storage library of claim 22, wherein said storage bins are arranged in a planar array, and wherein said plurality of drive slots are arranged in the plane of said planar array for access thereto by said at least one accessor.

24. The automated data storage library of claim 22, wherein said removable mount access engagement surfaces comprise engagement apertures for engagement by said at least one accessor.

25. The automated data storage library of claim 22, wherein said data storage drive removable mounts and at least said RAID configuration drive slot mating connections comprise mating low insertion force connectors for removably connecting said data storage drives to said RAID configuration of said library.

26. The automated data storage library of claim 25, additionally comprising actuators for releasing and engaging said low insertion force connectors, thereby providing zero insertion force connection.

27. The automated data storage library of claim 26, wherein said low insertion force actuators are mounted on said library at ones of said drive slots.

28. An automated data storage library for storing and accessing a plurality of data recording media stored in a plurality of storage bins, said data recording media having access engagement surfaces, comprising:

at least one read/write recording device for receiving said data recording media and reading and/or writing data thereon;

a plurality of drive removable mounts for individually mounting ones of mirrored data storage drives, said drive removable mounts having access engagement surfaces matching said data recording media access engagement surfaces;

a plurality of drive slots in said library for individually supporting ones of said drive removable mounts and said mounted data storage drives;

removable mounts supporting communication jumpers, said removable mounts having access engagement surfaces matching said data recording media access engagement surfaces;

a plurality of jumper slots in said library for individually supporting ones of said removable mounts and said mounted communication jumpers;

at least two library accessors for accessing said data recording media and said removable mounts, engaging said data recording media and said removable mounts at said access engagement surfaces thereof, and transporting said data recording media and said removable mounts; and at least two library controllers, each having a plurality of mirrored data storage drives for providing library operation tables, said mirrored data storage drives mounted on said drive removable mounts, said drive slots connected to ones of said library controllers, said plurality of jumper slots having connections respectively interconnecting one of said library controllers to one of said library accessors, said library controllers capable of operating one or two of said at least two library accessors to access and transport said data recording media between said storage bins and said at least one read/write recording device, and at least one of said library controllers capable of operating at least one of said library accessors to engage selected ones of said plurality of mirrored data storage drive removable mounts at said access engagement surfaces thereof to transport selected ones of said mirrored data storage drives between selected ones of said plurality of drive slots, and operating said library accessors to engage selected ones of said plurality of communication jumper removable mounts at said access engagement surfaces thereof to transport selected ones of said communication jumpers between selected ones of said plurality of jumper slots.

29. The automated data storage library of claim 28, wherein said storage bins are arranged in a planar array, and wherein said plurality of drive slots and said plurality of jumper slots are arranged in the plane of said planar array for access thereto by said library accessors.

30. The automated data storage library of claim 28, wherein said removable mount access engagement surfaces comprise engagement apertures for engagement by said accessors.

31. The automated data storage library of claim 28, wherein said data storage drive removable mounts and said drive slots, and said communication jumper removable mounts and said plurality of jumper slots additionally comprise respective mating low insertion force connectors for removably connecting said data storage drives and said communication jumpers to said library.

32. The automated data storage library of claim 31, additionally comprising low insertion force actuators for releasing and engaging said low insertion force connectors, thereby providing zero insertion force connection.

33. The automated data storage library of claim 32, wherein said low insertion force actuators are mounted on said library at said drive slots and at said jumper slots.

34. An automated data storage library for storing and accessing a plurality of data recording media stored in a plurality of storage bins, said data recording media having access engagement surfaces, and for accessing a plurality of removable mounts for individually mounting ones of electronic components, said removable mounts having access engagement surfaces matching said data recording media access engagement surfaces, and having electrical connectors for said electronic components, comprising:

at least one read/write recording device for receiving said data recording media and reading and/or writing data thereon;

a plurality of component slots in said library for individually supporting ones of said removable mounts and said mounted electronic components;

low insertion force connectors at ones of said component slots for mating with and removably connecting said removable mount electrical connectors, to removably connect said mounted electronic components to said library;

at least one library accessor for accessing said data recording media, engaging said data recording media at said access engagement surfaces thereof, and transporting said data recording media, and for engaging said plurality of removable mounts at said access engagement surfaces thereof, and transporting said removable mounts; and at least one library controller for operating said at least one library accessor to access and transport said data recording media between said storage bins and said at least one read/write recording device, and for operating said at least one library accessor to engage and to transport selected ones of said removable mounts and said mounted electronic components between selected ones of said plurality of component slots, and connect ones of said electronic components to said library with said mating low insertion force connectors.

35. The automated data storage library of claim 34, additionally comprising actuators for releasing and engaging said low insertion force connectors, thereby providing zero insertion force connection.

36. The automated data storage library of claim 35, wherein said low insertion force actuators are mounted on said library at said ones of said component slots having said low insertion force connectors.

37. An automated data storage library for storing and accessing a plurality of data recording media stored in a plurality of storage bins, said data recording media having access engagement surfaces, and for accessing a plurality of removable mounts for individually mounting ones of electronic components, said removable mounts having access engagement surfaces matching said data recording media access engagement surfaces, having electrical connectors for said electronic components, and having a plurality of read/write recording devices, ones of said read/write recording devices mounted on ones of said removable mounts, comprising:

a plurality of component slots in said library for individually supporting ones of said removable mounts and said mounted electronic components;

low insertion force connectors at ones of said component slots, including at least one slot for supporting one of said mounted read/write recording devices for receiving thereat said data recording media and reading and/or writing data thereon, said low insertion force connectors for mating with and removably connecting said removable mount electrical connectors, to removably connect said mounted electronic components to said library;

at least one library accessor for accessing said data recording media, engaging said data recording media at said access engagement surfaces thereof, and transporting said data recording media, and for engaging said plurality of removable mounts at said access engagement surfaces thereof, and transporting said removable mounts; and at least one library controller for operating said at least one library accessor to access and transport said data recording media between said storage bins and said at least one read/write recording device supported in said component slot, and for operating said at least one library accessor to engage and to transport selected ones of said removable mounts and said mounted electronic components between selected ones of said plurality of component slots, and connect ones of said electronic components to said library with said mating low insertion force connectors.

38. The automated data storage library of claim 37, wherein said at least ones of said component slots having said mating low insertion force connectors for removably connecting said read/write recording devices are provided with location addresses identifying said devices which are different from said addresses for said devices for receiving said data recording media, whereby said at least one library controller may exchange ones of said read/write recording devices wherein at least one of said read/write recording devices is located at one of said component slots having said mating low insertion force connectors.

39. The automated data storage library of claim 38, additionally comprising at least one actuator for releasing and engaging said low insertion force connectors, thereby providing zero insertion force connection, and wherein said at least one low insertion force actuator is mounted on said library at one of said component slots having said mating low insertion force connectors.

40. The automated data storage library of claim 39, wherein said at least one low insertion force actuator comprises a motor for operating said actuator, and said motor is operated by said at least one controller.

* * * * *